Dec. 19, 1967  N. HIGUCHI  3,358,340
BRIDLE BUCKLE
Filed Oct. 23, 1965  2 Sheets-Sheet 1

INVENTOR
NORI HIGUCHI
BY
ATTORNEY

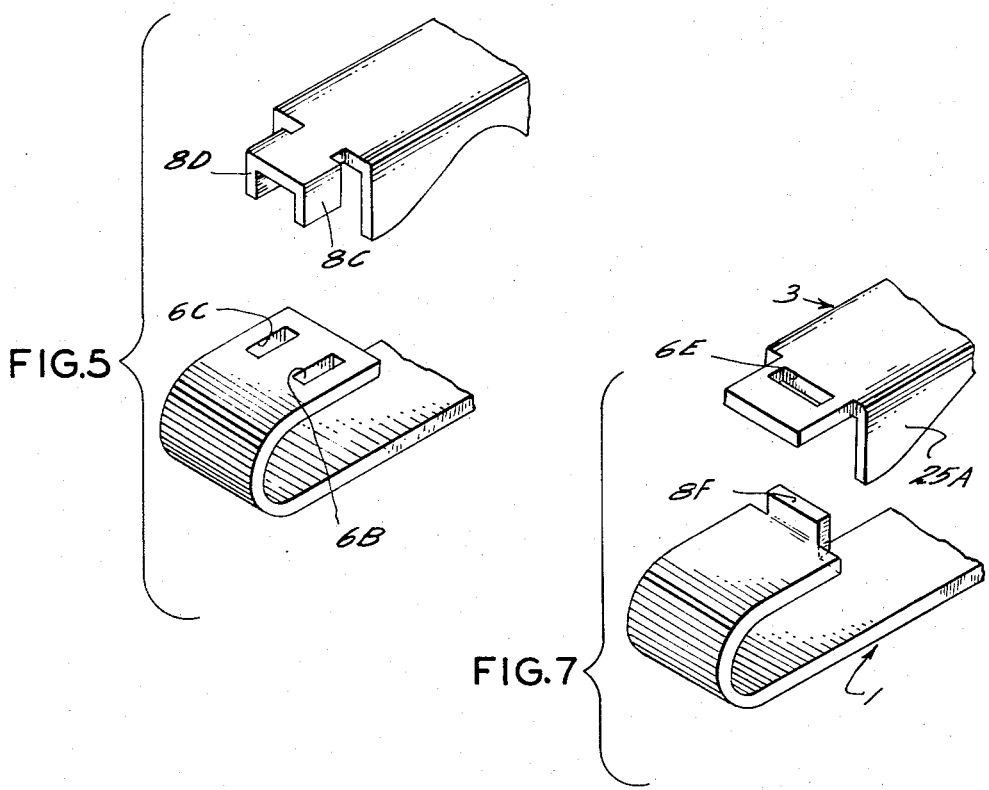
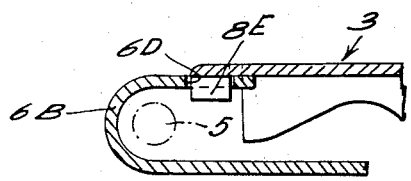
FIG 6
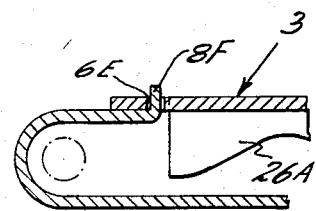
FIG 8
INVENTOR
NORI HIGUCHI
BY
ATTORNEY

United States Patent Office 3,358,340
Patented Dec. 19, 1967

3,358,340
BRIDLE BUCKLE
Nori Higuchi, Northport, N.Y., assignor to Davis Aircraft Products, Inc., Northport, N.Y.
Filed Oct. 23, 1965, Ser. No. 502,883
12 Claims. (Cl. 24—235)

ABSTRACT OF THE DISCLOSURE

A snap hook assembly including a hook, a retainer member pivotally mounted on the hook defining an enclosed area for reception of a load element, the retainer member cooperating with the hook member so that loads exerted on the assembly are distributed through the hook and the retainer member, and a keeper member associated with the retainer member and extending into the enclosed area so as to confine the movement of the load element and thereby prevent accidental removal of the load element from the snap hook.

---

Figure 1:
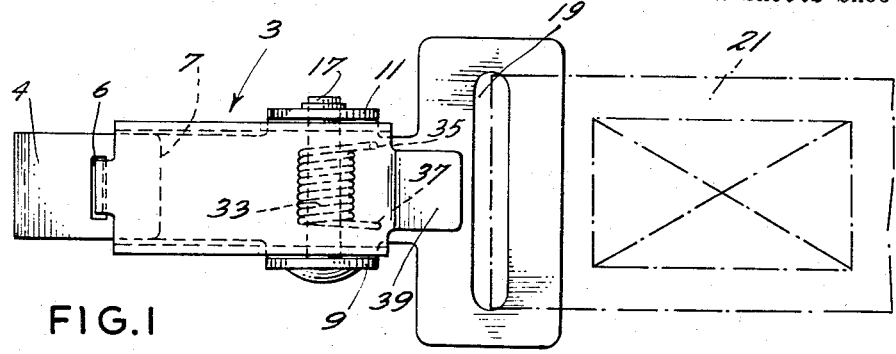

The present invention relates to a new and novel snap hook for releasably engaging a loop, bar or other element.

Briefly, the present invention comprises a hook member support means which is adapted to engage a loop, bar or other load exerting element. A retainer member is provided for keeping the hook member from becoming disengaged from the load element.

The retainer member includes a keeper member which performs a double function. Firstly, the keeper member positively locks the load element in the hook member so as to prevent accidental displacement of the retainer member in response to turning or twisting of the load element. Secondly, the keeper member cooperates with the hook member so as to distribute a portion of the load carried by the hook member to the retainer member.

The retainer member further includes means for preventing accidental mislatching of the load element.

While the snap hook of the present invention has many uses, one particular application is its use as a bridle buckle for connecting the webbing of a horse harness to a loop or other element on the harness. The present invention provides an adequately strong snap hook for this purpose while keeping the weight of the snap hook and consequently, the weight carried by the horse to a minimum. In addition, the surface of the snap hook which bears or is apt to bear against the horse is smooth to minimize the possibility of a sharp edge impinging the horse. Further, provision is made for preventing parts of the harness or parts of the mane of a horse from catching in between the retainer member and the hook member.

An object of the present invention is to provide a new and novel snap hook.

A further object of the present invention is to provide a snap hook of reduced weight without sacrificing strength.

A further object of the present invention is to provide a snap hook for engaging a companion load element having means for preventing accidental mislatching of the load element.

A further object of the present invention is to provide a snap hook having a retainer member which takes up a portion of the load exerted on the hook.

A further object of the present invention is to provide a snap hook having a retainer member including means for positively locking a load element in the hook member so as to prevent accidental displacement of the retainer member in response to turning or twisting of the load element.

A further object of the present invention is to provide a snap hook having a retainer member which includes a single means for performing the functions set forth in the last two paragraphs and in a modified form of the invention, a single means for performing the functions set forth in the first and third of the last three paragraphs.

A further object of the present invention is to provide a snap hook having an easily operated thumb-piece which is disposed so as to prevent accidental actuation thereof.

A further object of the present invention is to provide a snap hook which is particularly suitable for a harness in that it includes means for preventing other parts of the harness from catching therein and it possesses smooth surface portions so as to prevent a sharp edge from impinging upon the horse.

These and other objects and features of the present invention are pointed out in the following description in terms of the embodiments thereof which are illustrated in the accompanying drawings. It is to be understood that the drawing is for the purpose of illustration only and is not to be construed as defining the limits of the invention, reference being had to the appended claims for this purpose.

Figure 2:
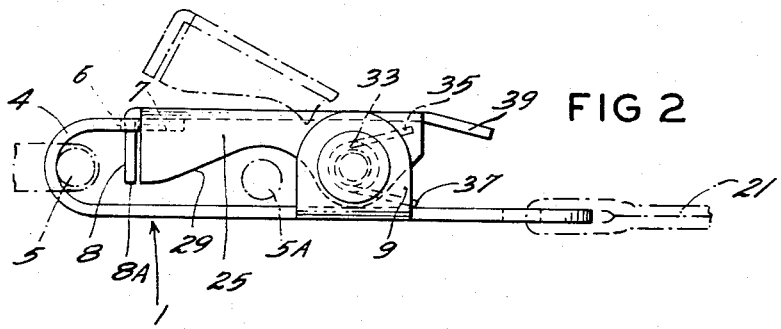
Figure 3:
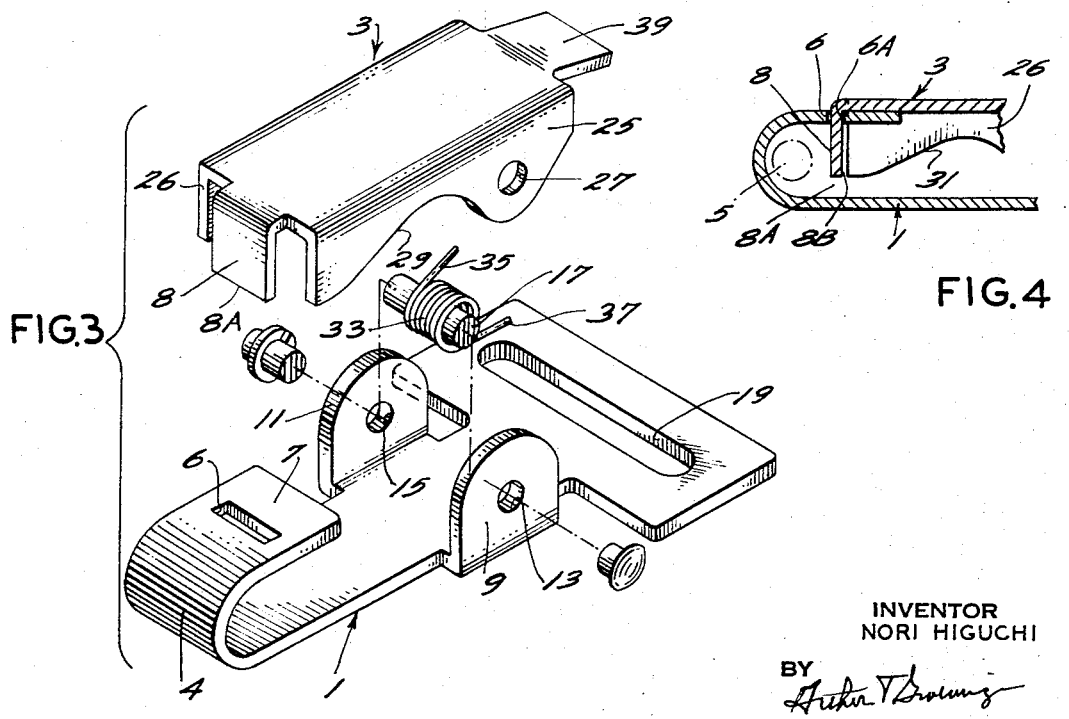
Figure 4:
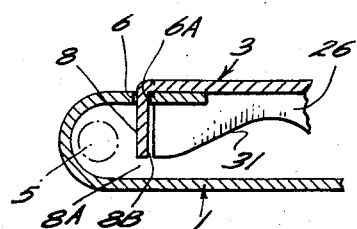

In the drawings:
FIG. 1 is a plan view of the present invention;
FIG. 2 is a side elevation of the present invention;
FIG. 3 is an exploded perspective view of the present invention;
FIG. 4 is an enlarged fragment illustrating in detail the keeper member;
FIGS. 5–8 are enlarged fragments showing modifications of the present invention.

Referring to FIGS. 1–3, the snap hook of the present invention is shown as comprising a hook member 1 and a retainer member 3.

The hook member 1 includes an arcuate portion 4, the inner surface of which is adapted to engage a loop member 5. A slot 6 is provided on hook member 1 intermediate the arcuate portion 4 and a free end portion 7 of hook member 1. The slot 6 is adapted to receive keeper member 8 which depends from retainer member 3, the function of which will be hereinafter explained.

The hook member 1 has integral therewith and upstanding therefrom side flanges 9 and 11. Flanges 9 and 11 have axially aligned apertures 13 and 15. A pivot pin 17 for pivotally mounting the retainer member 3 on hook member 1 extends through apertures 13 and 15.

A slot 19 is provided on hook member 1 to provide a web yoke through which a web 21 is looped and sewed or otherwise fastened together. It is to be understood that the means for connecting web 21 to the snap hook may take on many forms such as bar slides, adjustable cams, etc. so as to adjustably or nonadjustably engage web 21 or other object. One example of an alternative means is shown and described in U.S. Patent 2,896,288 which was issued to F. L. Davis on July 28, 1959.

The retainer member 3 functions to keep hook member 1 from being disengaged from the loop member 5. Side flanges 25 and 26, which are integral with and depend downwardly from retainer member 3, are adapted to extend between side flanges 9 and 11 of hook member 1. Pivot pin 17 extends through axially aligned apertures (one of which is shown at 27) in side flanges 25 and 26 so as to pivotally mount the retainer member 3 and so as to enable it to swing between an open position (shown in broken lines in FIG. 2) and a closed position.

The side flanges 25 and 26 include ramp portion 29 and 31, respectively, which function to prevent mislatching. Should the loop element 5 be accidentally positioned in a location such as 5A (FIG. 2), the loop element will automatically position itself to its proper location when the load is exerted because the retainer member 3 will lift to a partially opened position when ramps 29 and 31 engage the load element 5A, thereby enabling the loop element to travel to its proper position.

A coil spring 33 encircles pivot pin 17. One free end portion 35 of coil spring 33 bears against the undersurface of retainer member 3 and the opposite free end portion 37 of coil spring 33 bears against the upper surface of hook member 1 so as to normally bias the retainer member to a closed position.

The retainer member 3 includes a downwardly inclined tongue 39 which serves as a thumb or hand piece for rocking the retainer member 3 from its normal closed position to its open position. Due to its downwardly angled construction, thumb piece 39 is protected against accidental engagement with other parts upon the buckle being inadvertently turned over.

When the thumb piece 39 is depressed and the retainer member 3 is pivoted to an open position, the lower extremity 8A of keeper member 8 is located above aperture 6 a distance sufficient to allow easy entrance of the loop member 5 into the hook member 1. Once the hook member 1 is positioned against the inner surface of arcuate portion 4, keeper member 8 functions to positively lock the loop element 5 in place.

Referring to FIG. 4, the keeper member 8 is integral with retainer member 3 and extends at substantially right angles thereto. When the retainer member 3 is returned to a closed position, the distance between the lower extremity 8A of keeper member 8 and the adjacent surface of hook member 1 is smaller than the diameter of loop member 5. Loop element 5 is thus locked in the area defined by arcuate portion 4 in keeper member 8. With loop element 5 locked in this area, accidental displacement of retainer member 3 in response to turning, twisting or other movement of loop element 5 is precluded.

It is to be understood that the lower extremity 8A of keeper member 8 may engage the adjacent surface of hook member 1. In this case, however, provision would have to be made to allow retainer member 3 to pivot to a greater angle so as to allow entrance of the load element 5.

Keeper member 8 performs a highly significant additional function. There is a very small clearance, e.g. .01 inch, between the inner surface 8B of keeper member 8 and surface 6A of slot 6 when the hook member 1 is unloaded. When a heavy load is imposed, arcuate portion 4 and slot 6 deflect in response to the applied load a distance greater than .01 inch and then with surface 6A flushly abutting surface 8B, a portion of the imposed load is transmitted to retainer member 3, thereby reducing the applied stress on the hook member 1. The retainer member 3 assumes the applied load with a minimum of bending stresses applied thereto.

It is to be understood that the construction may be modified by having inner surface 8B of keeper member 8 normally engaging surface 6A even when the hook is unloaded. A portion of the imposed load will then be transmitted to retainer member 3 regardless of the load involved.

While the invention is capable of use in many different devices, it has been successfully used in a harness for racing horses. Of significance in this regard are the structural portions of the present invention which contact or are apt to contact the horse.

The undersurface of the snap hook which bears against the horse is flat and smooth. If the snap hook is accidentally tilted, the arcuate portion 4 provides a continuous smooth surface. If the snap hook is tilted about the slotted end portion of the hook 1, the webbing 21 further provides a continuous and smooth surface. Because of these structural features, the danger of a sharp edge impinging the horse is greatly minimized.

It should also be noted that side flanges 25 and 26 overhang the side edges of portion 7 so as to cover the latter thereby preventing parts of the harness, or parts of the mane or the tail of the horse from catching in between the retainer member 3 and end portion 7.

Attention should also be directed to the structure of thumb piece 39. The open area adjacent to thumb piece 39 permits actuation of the snap hook by a gloved hand. The season for harness racing extends into the winter, making it essential that harness snap hooks be made operable by gloved hands.

It is to be further understood that keeper member 8 and slot 6 may be made into a two or plural component arrangement and/or extended longitudinally rather than laterally as shown, e.g. in FIG. 5. In FIG. 5, hook member 1 is provided with longitudinally arranged slots 6B and 6C to receive keeper member 8C and 8D.

Further modifications of the present invention are shown in FIGS. 6–8. In these modifications the side flanges 25A and 26A, which are identical to side flanges 25 and 26 in the other figures, function to lock load element 5 in place so as to prevent inadvertent opening of retainer member 3 in response to the load element 5 twisting and turning. In FIG. 6 keeper 8E extends through slot 6D but terminates adjacent thereto and functions to distribute the load to the retainer member 3. FIGURES 7 and 8 show a further modification with keeper 8F extending upwardly from the hook member and through a slot 6E formed in the retainer member 3.

While several embodiments of the invention have been illustrated and described, various changes in the form and relative arrangements of the parts, which will now appear to those skilled in the art may be made without departing from the scope of the invention. Reference is therefore to be had to the appended claims for a definition of the limits of the invention.

What is claimed is:

1. A connector comprising a support means for engaging a load element, retainer means cooperating with said support means for preventing said load element from disengaging said support means, means for movably mounting said retainer means for allowing said load element to be disengaged from said support means, means for distributing a portion of the load exerted on said support means through said retainer means; said last mentioned means including means for preventing movement of said retainer means in response to movement of said load element.

2. A connector comprising a hook member for engaging a load element, a retainer member, means for pivotally mounting said retainer member on said hook member, means biasing said retainer member to a closed position for preventing said retainer member from disengaging said hook member, manually actuated means for pivoting said retainer means to an open position to allow release of said load element from said hook member, said hook member having an apertured portion, said retainer member having a keeper means, said keeper means extending through the aperture in said apertured portion for distributing the load exerted on said hook member through said retainer member, said keeper means cooperating with said hook member to keep said load element in a confined area to prevent said retainer member from moving to an open position in response to turning or twisting movement of said load element.

3. A connector as defined by claim 2, said retainer member including a ramp means, said ramp means cooperating with said hook member and said load element for allowing movement of said load element to said confined area in response to a load being exerted by said load element.

4. A connector comprising support means, a retainer means, said retainer means including a keeper means, said keeper means cooperating with said retainer means and said support means to define first and a second substantially enclosed areas, a load element in one of said areas, means responsive to a load being exerted by said load element for moving said keeper means to allow said load element to move from said first enclosed area to said second enclosed area, means for distributing loads exerted by said load element through said support means and said retainer means.

5. A connector comprising a hook member, a retainer member, means for pivotally mounting said retainer member on said hook member, said hook member having an apertured portion, said retainer member having a keeper means integral therewith and extending through said apertured portion, said retainer member having side flanges depending therefrom, said side flanges including a ramp portion.

6. A connector as defined by claim 5, said retainer means including manually actuated means for pivoting said retainer member, said manually actuated means being free of surrounding structure to allow easy actuation thereof, said manually actuated means being angled toward said hook member to prevent inadvertent actuation thereof.

7. A connector as defined by claim 5, wherein said side flanges overlap side edges of said hook member.

8. A connector as defined by claim 5, wherein said side flanges cooperate with said hook member to define an enclosed area for preventing movement of said retainer member in response to movement of said load element.

9. A connector as defined by claim 5, wherein said apertured portion includes a plurality of apertures and said keeper means includes a corresponding plurality of keeper members.

10. A connector as defined by claim 5, wherein said connector has a substantially continuous, smooth outer surface.

11. An assembly comprising a connector, a load element engaging said connector, said connector including a confining means and a retainer means, means for movably mounting said retainer means to allow movement of said retainer means to an open position so that said load element may be disengaged from said connector, said retainer means including means for preventing said load element from disengaging said connector in response to twisting movement of said load element, said last mentioned means including a keeper member extending from said retainer means and defining a substantially enclosed area with said confining means, said enclosed area being enclosed at least to the extent that there are no openings therein of a size greater than the thickness of said load element, said keeper means having a surface facing said confined area, said keeper means being disposed relative to said retainer means so that forces directed perpendicular to said surface transmit a force to said retainer means which is other than the force required to move the retainer member to an open position, means for distributing loads exerted by said load element through said confining means and said retainer means.

12. An assembly including a hook, a retainer member pivotally mounted on said hook defining an enclosed area for reception of a load element, said retainer member cooperating with said hook so that loads exerted on the assembly are transmitted through both said hook and said retainer member, and a keeper means associated with the retainer member and extending into said enclosed area so as to confine the movement of the load element to within an area defined by said hook and said keeper means so as to prevent accidental removal of said load element from said assembly.

References Cited
UNITED STATES PATENTS

| | | | |
|---|---|---|---|
| 385,579 | 7/1888 | Smith | 24—235 |
| 552,426 | 12/1895 | Fisher. | |
| 815,604 | 3/1906 | Lipkowits | 24—165 |
| 1,430,824 | 10/1922 | Martin | 24—241 |
| 1,450,264 | 4/1923 | Schitterer | 24—240 |
| 1,597,417 | 8/1926 | Rioux | 24—241 |
| 3,074,136 | 1/1963 | Looker | 24—165 |

FOREIGN PATENTS

| | | |
|---|---|---|
| 129,959 | 1/1929 | Switzerland. |

DONALD A. GRIFFIN, *Primary Examiner.*